Figure 1:
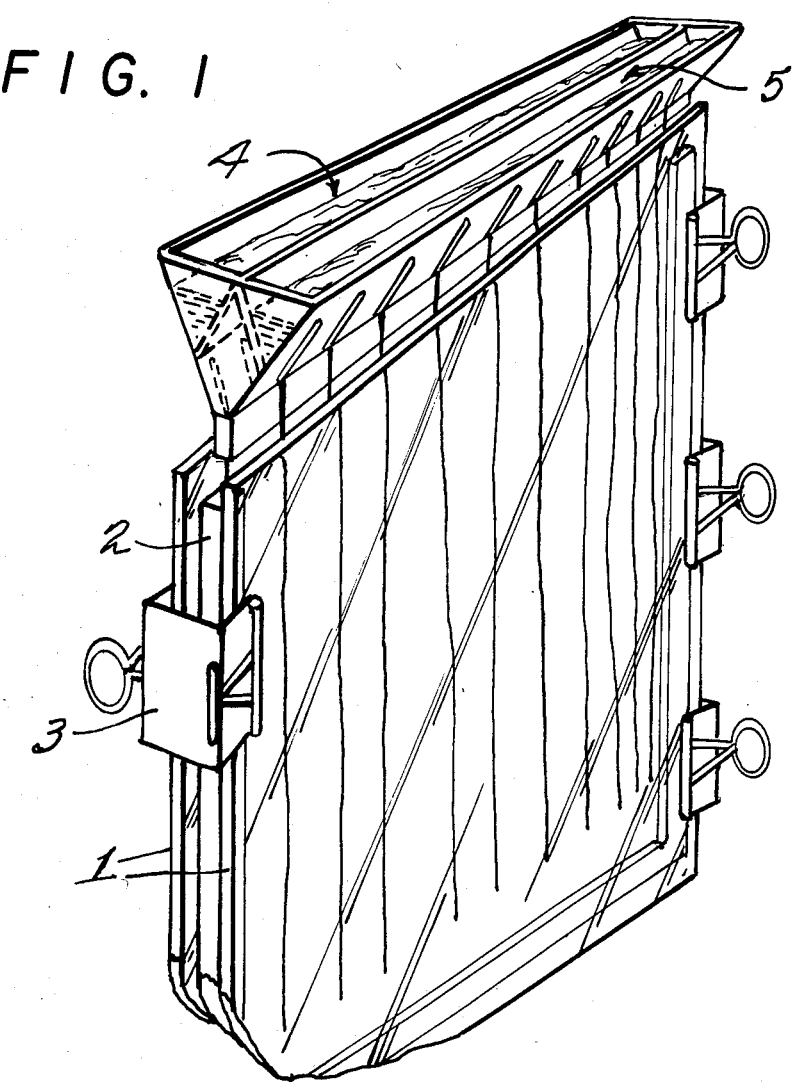

United States Patent [19]

Rochefort et al.

[11] Patent Number: 4,680,155
[45] Date of Patent: Jul. 14, 1987

[54] METHOD OF PRODUCING SHAPED ARTICLES HAVING A SIMULATED MARBLE APPEARANCE

[75] Inventors: Malcolm P. Rochefort, Darwen; Richard Wood, Blackburn, both of England

[73] Assignee: Imperial Chemical Industries PLC, London, England

[21] Appl. No.: 725,812

[22] Filed: Apr. 22, 1985

[30] Foreign Application Priority Data

May 9, 1984 [GB] United Kingdom ................ 8411824

[51] Int. Cl.⁴ .............................................. B29C 39/12
[52] U.S. Cl. ..................... 264/73; 264/108; 264/236; 264/245; 264/331.18; 264/347
[58] Field of Search ................. 264/73, 77, 245, 316, 264/2.2, 310, 108, 236, 347, 331.18

[56] References Cited

U.S. PATENT DOCUMENTS

| | | | |
|---|---|---|---|
| 2,668,328 | 2/1954 | Porter | 264/108 |
| 2,971,223 | 2/1961 | Grunin et al. | 264/108 |
| 3,041,670 | 7/1962 | Broderson | 264/108 |
| 3,164,647 | 1/1965 | Fischler | 264/108 |
| 3,222,439 | 12/1965 | Bolomey et al. | 264/310 |
| 3,706,825 | 12/1972 | Hall et al. | 264/245 |
| 3,981,951 | 9/1976 | Richman | 264/73 |

FOREIGN PATENT DOCUMENTS

| | | | |
|---|---|---|---|
| 53-1254 | 1/1978 | Japan | 264/73 |
| 57-6718 | 1/1982 | Japan | 264/73 |
| 58-55234 | 4/1983 | Japan | 264/245 |

Primary Examiner—Jeffery Thurlow
Attorney, Agent, or Firm—Cushman, Darby & Cushman

[57] ABSTRACT

A method of forming simulated marble articles from materials polymerizable within a cell or mould characterized in that the mould is filled under conditions in which the polymerizable materials are introduced as streams following the flow path into the cell or mould and the contents are polymerized with the cell or mould disposed so that the flow lines are on a height gradient relative to each other. Limited intermixing of the compositions during the initial stages of the curing process produce an attractive simulated marble effect. The mould may be filled so that the flow lines are disposed in a near vertical position and then rotated so that they are in a near horizontal position with adjacent flow lines on a near vertical height gradient.

9 Claims, 3 Drawing Figures

METHOD OF PRODUCING SHAPED ARTICLES HAVING A SIMULATED MARBLE APPEARANCE

This invention relates to a method of producing shaped articles having the appearance of simulated marble. Articles having such an appearance made from thermoplastic or thermosetting materials are widely used in kitchens, for example as working surfaces, in sanitaryware, as baths or basins and in a variety of other applications such as decorative flat sheet. The present invention provides an inexpensive process which is readily adapted to known polymerisation processes.

According to the invention there is provided a method of forming a shaped article having the appearance of simulated marble wherein polymerisable materials are polymerised within the cavity of a mould or cell characterised in that the mould is filled with a stream of a fluid polymerisable composition comprising at least two compositions of different colours wherein the at least two compositions are introduced into the mould or cell in streams as a pattern of lines following the flow path of the compositions into the mould and the polymerisation process is conducted with the mould or cell disposed so that the flow lines are on a height gradient relative to each other, whereby limited mixing of the compositions takes place during the polymerisation whilst the polymerisable compositions are sufficiently fluid. Preferably the streams of the composition have a diameter of at least 1 mm. Preferably the height gradient of the flow lines is disposed to be within ±45° from the vertical and for convenience is desirably substantially vertical.

For optimum control of the marble effect finally achieved it is preferred that the viscosities of the component compositions should be similar, that is they do not differ by more than a factor of 5 and preferably by not more than a factor of 2. The two or more components preferably have viscosities in the range 0.1 to 50 Poise, desirably between 1 and 10 Poise measured at 23° C. In a preferred process the mould is filled under conditions where there is little tendency for mixing of streams, that is in a disposition where the height gradient of the flow lines is within ±45° of the horizontal and is then rotated to be polymerised.

The invention may be applied to the production of flat sheet, for example in the conventional cell cast polymerisation of methyl methacrylate compositions between a pair of flat plates or it may be applied to the moulding of an article from a polymerisable composition between a pair of mould surfaces having curvature defining an article such as a wash basin or a sink.

Figure 2:
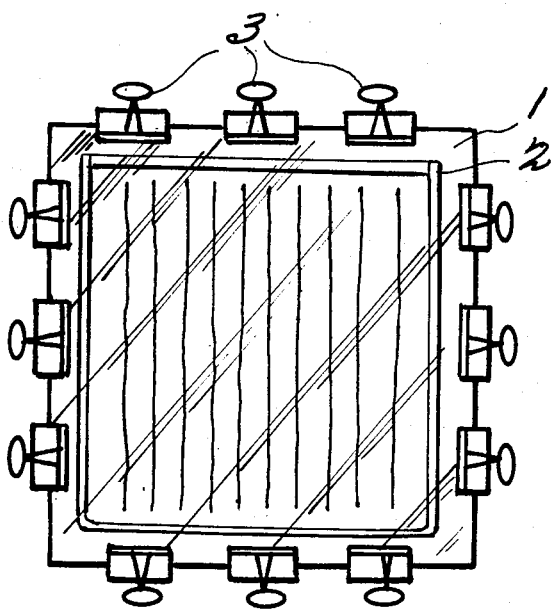
Figure 3:
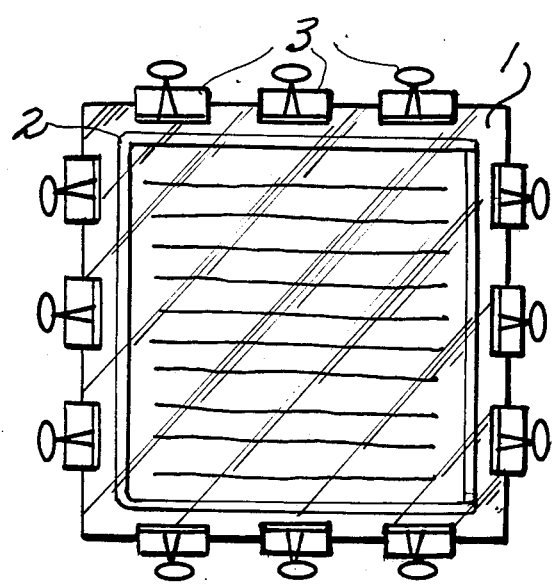

The cell or mould may be filled in any manner which permits the at least two components to be introduced in the form of aligned streams of each composition. The components may be introduced under the effect of gravity or may be pumped into the cell or mould, providing venting, where necessary, to enable the air in the cell or mould to be displaced. A simple pouring apparatus can be provided for a flat cell by using a funnel in the form of a trough, running the length of one edge of the cell, having subdivided portions to provide reservoirs of the different compositions, and having outlets which provide the required streams into the cell. Such a mould apparatus is shown in FIGS. 1, 2 and 3.

The polymerisable compositions used in the invention may take a variety of forms and include not only coloured and pigmented compositions but also compositions consisting essentially of a polymerisable monomer, or a polymerisable monomer containing polymer dissolved in the monomer. When one of the components comprises polymerisable materials containing no added colourants or pigments the components when polymerised give rise to areas of transparent or translucent contrast to coloured or pigmented areas in the article. A similar attractive effect is obtained when the polymerisable material contains a colourant sufficient to provide a coloured transparent or translucent effect. Preferred polymerisable compositions contain a major proportion of methyl methacrylate as the polymerisable constituent of the composition.

The colourants and pigments may be selected from those conventionally used for colouration and pigmentation of polymerisable materials, such as polymerisable acrylic systems having regard for the fact that the objective is to produce a simulated marble effect. These include inorganic pigments, particularly those having an average particle size in the range 0.5 to 50 microns, organic pigments, dyes and inorganic pigments which are available in non-sedimenting form such as those known as transparent iron oxides. Typical organic pigments are phthalocyanines, quinoacridones and endanthrones. Typical organic dyes are anthraquinones, monoazo and diazo dyes and perinones.

The polymerisable compositions may also contain high concentrations, that is at least 20% by volume, of finely divided fillers, suitable compositions being described in U.S. Pat. No. 4,221,697. The invention is further illustrated by reference to the following Examples.

EXAMPLE 1

A curable composition (A) of fine silica in methyl methacrylate monomer was prepared following the procedure given in Example 5 of British Patent Specification No. 1 493 393. The viscosity was adjusted to about 5 Poise by the dissolution in the methyl methacrylate monomer of a low molecular weight polymer of methyl methacrylate.

To one part of curable composition (A) was added 1% by weight of pigments based on iron oxides dispersed in dibutyl phthalate, to form a uniformly coloured curable composition (B). As shown in FIG. 1, a polymerisation cell was prepared from a pair of flat glass plates 1 separated by a 7.5 mm thick gasket 2 along three sides. The open side without gasket 2 was held uppermost with the cell vertical ready for filling. The plates were biassed against the gasket 2 by clamps 3.

Composition (A) and composition (B) were then poured into the cavity between plates 1 using a pouring apparatus as described below.

The pouring apparatus consisted of an elongated funnel running the width of the cell (270 mm) with two separate reservoirs 4 and 5 each with adjustable slit outlets, 270 mm long. The slits were adjusted so that when compositions 4 and 5 were poured simultaneously into reservoirs 4 and B respectively, the slit below reservoir A let material through into the cell faster than the rate at which coloured composition B was let through by the slit below reservoir 5. In addition, the slit outlet of reservoir 5 was furnished with notches so that coloured composition B filled the cell in a series of vertical streaks, against a background of composition A. The filled cell contained A and B in the weight proportion 3:1.

After filling, the cell was sealed with a further length of gasket (not shown) along the open side and the position of this side (uppermost) noted by marking the cell. As shown by FIGS. 2 and 3, the cell was then turned through 90° keeping the cell in a vertical aspect so that vertical coloured streaks formed during pouring were now horizontal. The contents of the cell were cured with the cell in a vertical position at 60° C. in a water bath for 30 minutes. After curing, the cell was transferred to another water bath at 90° C. for post curing treatment for 30 minutes.

On demoulding, a flat sheet was obtained with an attractive random pattern of colour giving a marble-like effect. This attractive pattern was formed by thermal convection currents across the lines of filling during curing.

EXAMPLE 2

Curable compositions (A) and (B) were prepared as in Example 1.

In place of the polymerisation cell formed from glass plates as in Example 1, a heated metal disc mould was used. This consisted of two nickel surfaced discs, male (diam 218 mm) and female (diam 231 mm) separated by a gasket of EPDM synthetic rubber. Sealing was secured by applying pressure to one half of the mould by means of inflatable air bags. This pressure could also be used to take up shrinkage of the resin during curing to obtain a good surface on the moulded article.

The gasket and sealing pressure were chosen so that a cavity 10 mm thick was formed between the male and female halves of the mould.

The mould was held so that the disc cavity was vertical. The female half was heated to 60° C. and the male half to 55° C.

The curable compositions were then introduced simultaneously into the mould by pumping through a nozzle in the male half, 40 mm up from the lower edge. Curable composition (A) and coloured curable composition (B) were fed from separate reservoirs and mixed through a Y piece before entering the mould. The flows were adjusted so that more of composition (A) entered the mould than of composition (B). The mould was filled through a 9 mm diameter nozzle in 20 seconds. A vent was located at the top edge of the mould in the side of the female half to allow air to be displaced. The filled mould contained A and B in the weight proportion 3:1.

After filling, the nozzle and vent were sealed off and the composition cured for 15 minutes using a pressure of 2.5 bar (gauge) in the inflatable air bags. The temperature of the female half was then raised to 95° C., and the male half to 90° C., and the air bag pressure to 4.5 bar (gauge). This was left for 25 minutes to complete the curing process.

On demoulding a flat solid disc was obtained with two good surfaces, having an attractive marble-like pattern formed by convection currents set up during the curing process.

EXAMPLE 3

This example illustrates the use of two compositions which are premixed before being introduced into the cell.

Curable compositions (A) and (B) were prepared as in Example 1.

A curable composition (C) was prepared by adding 20 grams of component (B) to 2 kilograms of component (A), with poor mixing achieved by a single rotation of a metal stirrer such that component (B) clearly remained as visible streaks and was not substantially blended into component (A).

Curable composition (C) was then injected into a heated disc mould of the type described in Example 2. All other procedures were conducted as for Example 2.

The rapid introduction of the inhomogeneous mixture into the mould caused the two components to enter as elongated streams in the direction of flow into the mould. After the curing operation these streams had interdispersed to produce an attractive marble-like patterned disc.

COMPARATIVE EXAMPLE A

In this example, the procedure of Example 1 was followed, but the polymerisation cell was cured in a horizontal position instead of vertical.

On demoulding, a flat sheet was obtained with an unattractive blotchy pattern, unlike marble.

COMPARATIVE EXAMPLE B

The procedure in Example 1 was repeated, but the cell was not turned 90° before curing in a vertical position, so that the flow lines remained essentially vertical during curing.

The patterned flat sheet obtained on demoulding lacked the attractive randomness of that from Example 1, many of the flow lines still being clearly visible.

COMPARATIVE EXAMPLE C

The procedure used in Example 2 was repeated except that after filling the disc mould, it was turned through 90° so that the disc was horizontal, female side down, during curing.

An unattractive blotchy pattern unlike marble obtained on the demoulded disc.

EXAMPLE 4

In this example a sheet (125 cm×95 cm) having a thickness of 5 mm was prepared from two pigmented syrups of polymethyl methacrylate in methyl methacrylate. A syrup (designated A) was prepared by polymerising methyl methacrylate with 0.005% by weight of the monomer of dispersed titanium dioxide pigment using 0.001% by weight of azodiisobutyronitrile as catalyst. The polymerisation was continued until 7% by weight of the monomer had polymerised. The viscosity of the syrup was about 3 Poise.

A second syrup (designated B) was prepared in the same manner from methyl methacrylate containing 0.005% by weight of dispersed iron oxide pigment.

Additional azodiisobutyronitrile (0.008% by weight) was added to each of the syrups. The syrups (2630 g of syrup A and 3950 g of syrup B) were introduced into a polymerisation cell constructed from glass plates in the following manner. A V-section feeding trough was constructed from cardboard to provide a feeding means along the whole length (125 cm) of the cell. The cell was positioned in a vertical position and the two syrups poured into the trough at a rate sufficient to maintain a constant head of syrup in the trough (until the prescribed quantities of syrup had been added). The narrow outlet of the trough leading into the cell (approximately 2 mm in width) and the viscosities of the syrups ensured that the syrup mixture was held up in the cell for a sufficient time to build up a head and that only limited mixing occurred as the syrups entered the cell. The result was that the mixture entered the cell as a random mixture of contacting streams of the separate syrups in an essentially vertical direction.

The pouring process took about 10 minutes to complete. After completion the cell was sealed and rotated in the vertical plane through 90° (i.e. at 90° to the direction of introduction of the syrups into the cell). The cell was introduced in this disposition into a polymerisation water bath maintained at 60° C. for 8 hours. After this stage the temperature was raised to 90° C. for 30 minutes.

The product sheet had an attractive random marbleised appearance.

We claim:

1. A method of forming a shaped article having the appearance of simulated marble wherein polymerisable materials are polymerised within the cavity of a mould or cell characterized in that the mould is filled with a stream of a fluid polymerisable composition comprising at least two compositions of different colors wherein the at least two compositions are caused to flow into the mould or cell in contacting streams as a pattern of lines following the flow path of the compositions into the mould and the polymerisation process is conducted with the mould or cell disposed so that the flow lines are on a height gradient relative to each other, whereby limited mixing of the composition takes place by thermal convection currents during the polymerisation whilst the polymerisable compositions are sufficiently fluid.

2. A method according to claim 1 wherein the polymerisation process is conducted with the mould disposed so that the height gradient of the flow lines lie in a disposition within ±45° from the vertical.

3. A method according to either of claims 1 or 2 in which the mould is filled so that the height gradient of the flow lines is within ±45° of the horizontal during the filling operation and the mould is then rotated so that the height gradient of the flow lines is within ±45° of the vertical.

4. A method according to claim 1 in which the diameter of the streams making up the composition is at least 1 mm.

5. A method according to claim 1 in which the viscosities of the components do not differ by more than a factor of 5.

6. A method according to claim 5 in which the viscosities of the components of the composition are within the range 0.1 to 50 Poise measured at 23° C.

7. A method according to either of claims 5 or 6 in which the components are premixed to form an inhomogeneous mixture prior to introduction into the mould.

8. A method according to claim 1 in which the polymerisable constituent of the polymerisable compositions contains a major proportion of methyl methacrylate.

9. A method according to claim 1 in which the polymerisable compositions contain at least 20% by volume of finely divided fillers.

* * * * *